US009011247B2

(12) United States Patent
Gronkowski et al.

(10) Patent No.: US 9,011,247 B2
(45) Date of Patent: Apr. 21, 2015

(54) CONTROLLING CASINO LIGHTING CONTENT AND AUDIO CONTENT

(75) Inventors: Timothy T. Gronkowski, Chicago, IL (US); Paul J. Radek, Naperville, IL (US); Martin R. Ugarte, Jr., Chicago, IL (US); Steven J. Zoloto, Highland Park, IL (US)

(73) Assignee: WMS Gaming, Inc., Waukegan, IL (US)

( * ) Notice: Subject to any disclaimer, the term of this patent is extended or adjusted under 35 U.S.C. 154(b) by 78 days.

(21) Appl. No.: 13/388,118

(22) PCT Filed: Jul. 30, 2010

(86) PCT No.: PCT/US2010/043886

§ 371 (c)(1),
(2), (4) Date: Jan. 31, 2012

(87) PCT Pub. No.: WO2011/014760

PCT Pub. Date: Feb. 3, 2011

(65) Prior Publication Data

US 2012/0129601 A1 May 24, 2012

Related U.S. Application Data

(60) Provisional application No. 61/230,372, filed on Jul. 31, 2009.

(51) Int. Cl.
*A63F 13/00* (2014.01)
*G07F 17/32* (2006.01)

(52) U.S. Cl.
CPC ........ *G07F 17/3227* (2013.01); *G07F 17/3211* (2013.01); *G07F 17/3239* (2013.01)

(58) Field of Classification Search
CPC .. A63F 13/00; G07F 17/3202; G07F 17/3211
USPC ......................................... 463/30, 31, 35, 42
See application file for complete search history.

(56) References Cited

U.S. PATENT DOCUMENTS 5,259,613 A * 11/1993 Marnell, II ...................... 463/42
5,483,631 A 1/1996 Nagai et al.

(Continued)

FOREIGN PATENT DOCUMENTS

EP 1439507 7/2004
WO WO-2004014501 2/2004

(Continued)

OTHER PUBLICATIONS

"PCT Application No. PCT/US10/43886 International Preliminary Report on Patentability", May 3, 2012 , 4 pages.

(Continued)

*Primary Examiner* — James S McClellan
(74) *Attorney, Agent, or Firm* — DeLizio Gilliam, PLLC

(57) ABSTRACT

A wagering game system and its operations are described herein. In embodiments, the operations can include presenting coordinated wagering game light and sound effects across multiple presentation devices in a casino. In some embodiments, the operations can trigger wagering game audio effects from lighting commands produced by network lighting controllers. The triggered audio can match characteristics of the light effects. The operations can include receiving, at a casino content presentation device, lighting data from a network lighting controller. The casino content presentation device associates the lighting data with a light effect and determines a sound effect, coupled with, or tied to, to, the light effect. The operations can further include presenting the sound effect on speakers associated with the casino content presentation device, and across other casino content presentation devices in the casino, as part of a casino-wide, synchronized, multi-media show.

24 Claims, 9 Drawing Sheets

(56) References Cited

U.S. PATENT DOCUMENTS

| | | | |
|---|---|---|---|
| 5,633,933 | A | 5/1997 | Aziz |
| 6,040,831 | A | 3/2000 | Nishida |
| 6,081,266 | A | 6/2000 | Sciammarella |
| 6,146,273 | A | 11/2000 | Olsen |
| 6,217,448 | B1 | 4/2001 | Olsen |
| 6,339,796 | B1 | 1/2002 | Gambino |
| 6,647,119 | B1 | 11/2003 | Slezak |
| 6,843,723 | B2 | 1/2005 | Joshi |
| 6,927,545 | B2 | 8/2005 | Belliveau |
| 6,939,226 | B1 | 9/2005 | Joshi |
| 6,960,136 | B2 | 11/2005 | Joshi et al. |
| 6,972,528 | B2 | 12/2005 | Shao |
| 6,974,385 | B2 | 12/2005 | Joshi et al. |
| 6,991,543 | B2 | 1/2006 | Joshi |
| 6,997,803 | B2 | 2/2006 | LeMay et al. |
| 7,082,572 | B2 | 7/2006 | Pea et al. |
| 7,112,139 | B2 | 9/2006 | Paz Barahona et al. |
| 7,181,370 | B2 | 2/2007 | Furem et al. |
| 7,228,190 | B2 | 6/2007 | Dowling et al. |
| 7,269,648 | B1 | 9/2007 | Krishnan et al. |
| 7,364,508 | B2 | 4/2008 | Loose et al. |
| 7,367,886 | B2 | 5/2008 | Loose et al. |
| 7,449,839 | B1 | 11/2008 | Chen |
| 7,479,063 | B2 | 1/2009 | Pryzby et al. |
| 7,495,671 | B2 | 2/2009 | Chemel et al. |
| 7,550,931 | B2 | 6/2009 | Lys et al. |
| 7,666,091 | B2 | 2/2010 | Joshi et al. |
| 7,682,249 | B2 | 3/2010 | Winans et al. |
| 7,811,170 | B2 | 10/2010 | Winans et al. |
| 7,867,085 | B2 | 1/2011 | Pryzby et al. |
| 8,591,315 | B2 | 11/2013 | Gagner et al. |
| 8,613,667 | B2 | 12/2013 | Brunell et al. |
| 8,622,830 | B2 | 1/2014 | Radek et al. |
| 8,814,673 | B1 | 8/2014 | Brunell et al. |
| 8,840,464 | B1 | 9/2014 | Brunell et al. |
| 2001/0021666 | A1 | 9/2001 | Yoshida et al. |
| 2002/0010018 | A1 | 1/2002 | Lemay et al. |
| 2002/0055978 | A1 | 5/2002 | Joon-Boo et al. |
| 2002/0160826 | A1 | 10/2002 | Gomez et al. |
| 2003/0002246 | A1 | 1/2003 | Kerr |
| 2003/0007648 | A1 | 1/2003 | Currell |
| 2003/0017865 | A1 | 1/2003 | Beaulieu et al. |
| 2003/0130033 | A1 | 7/2003 | Loose |
| 2003/0132722 | A1 | 7/2003 | Chansky et al. |
| 2004/0072610 | A1 | 4/2004 | White et al. |
| 2004/0160199 | A1 | 8/2004 | Morgan et al. |
| 2004/0178750 | A1 | 9/2004 | Belliveau |
| 2004/0209692 | A1 | 10/2004 | Schober et al. |
| 2005/0043090 | A1 | 2/2005 | Pryzby et al. |
| 2005/0044500 | A1 | 2/2005 | Orimoto et al. |
| 2005/0054440 | A1 | 3/2005 | Anderson et al. |
| 2005/0077843 | A1 | 4/2005 | Benditt |
| 2005/0116667 | A1 | 6/2005 | Mueller et al. |
| 2005/0128751 | A1 | 6/2005 | Roberge et al. |
| 2005/0153780 | A1 | 7/2005 | Gauselmann |
| 2005/0164785 | A1 | 7/2005 | Connelly |
| 2005/0164786 | A1 | 7/2005 | Connelly |
| 2005/0164787 | A1 | 7/2005 | Connelly |
| 2005/0164788 | A1 | 7/2005 | Grabiec |
| 2005/0174473 | A1 | 8/2005 | Morgan et al. |
| 2005/0200318 | A1 | 9/2005 | Hunt et al. |
| 2005/0239545 | A1 | 10/2005 | Rowe |
| 2005/0248299 | A1 | 11/2005 | Chemel et al. |
| 2005/0275626 | A1 | 12/2005 | Mueller et al. |
| 2005/0277469 | A1 | 12/2005 | Pryzby et al. |
| 2005/0282631 | A1 | 12/2005 | Bonney et al. |
| 2006/0009285 | A1 | 1/2006 | Pryzby et al. |
| 2006/0022214 | A1 | 2/2006 | Morgan et al. |
| 2006/0025211 | A1 | 2/2006 | Wilday et al. |
| 2006/0046829 | A1 | 3/2006 | White |
| 2006/0076908 | A1 | 4/2006 | Morgan et al. |
| 2006/0244622 | A1* | 11/2006 | Wray ........................ 340/815.45 |
| 2006/0253781 | A1 | 11/2006 | Pea et al. |
| 2007/0004510 | A1 | 1/2007 | Underdahl et al. |
| 2007/0008711 | A1 | 1/2007 | Kim |
| 2007/0032288 | A1 | 2/2007 | Nelson et al. |
| 2007/0036368 | A1 | 2/2007 | Hettinger et al. |
| 2007/0086754 | A1 | 4/2007 | Lys et al. |
| 2007/0111776 | A1 | 5/2007 | Griswold et al. |
| 2007/0189026 | A1 | 8/2007 | Chemel et al. |
| 2007/0218970 | A1 | 9/2007 | Patel et al. |
| 2007/0218974 | A1 | 9/2007 | Patel et al. |
| 2007/0219000 | A1 | 9/2007 | Aida |
| 2007/0291483 | A1 | 12/2007 | Lys |
| 2007/0293304 | A1 | 12/2007 | Loose et al. |
| 2008/0039213 | A1 | 2/2008 | Cornell et al. |
| 2008/0070685 | A1 | 3/2008 | Pryzby et al. |
| 2008/0094005 | A1 | 4/2008 | Rabiner et al. |
| 2008/0113715 | A1 | 5/2008 | Beadell et al. |
| 2008/0113796 | A1 | 5/2008 | Beadell et al. |
| 2008/0113821 | A1 | 5/2008 | Beadell et al. |
| 2008/0143267 | A1 | 6/2008 | Neuman |
| 2008/0161108 | A1 | 7/2008 | Dahl et al. |
| 2008/0176647 | A1 | 7/2008 | Acres |
| 2008/0231203 | A1 | 9/2008 | Budde et al. |
| 2008/0274793 | A1 | 11/2008 | Selig et al. |
| 2008/0278946 | A1 | 11/2008 | Tarter et al. |
| 2008/0288607 | A1 | 11/2008 | Muchow |
| 2008/0309259 | A1 | 12/2008 | Snijder et al. |
| 2009/0009997 | A1 | 1/2009 | Sanfilippo et al. |
| 2009/0023485 | A1 | 1/2009 | Ishihata et al. |
| 2009/0149242 | A1 | 6/2009 | Woodard et al. |
| 2009/0170597 | A1 | 7/2009 | Bone et al. |
| 2009/0197673 | A1 | 8/2009 | Bone et al. |
| 2009/0206773 | A1 | 8/2009 | Chang |
| 2009/0270167 | A1 | 10/2009 | Ajiro et al. |
| 2009/0298579 | A1 | 12/2009 | Radek et al. |
| 2009/0318223 | A1 | 12/2009 | Langridge et al. |
| 2010/0022298 | A1 | 1/2010 | Kukita |
| 2010/0022305 | A1 | 1/2010 | Yano |
| 2010/0029385 | A1 | 2/2010 | Garvey et al. |
| 2010/0031186 | A1 | 2/2010 | Tseng et al. |
| 2010/0075750 | A1 | 3/2010 | Bleich et al. |
| 2010/0113136 | A1 | 5/2010 | Joshi et al. |
| 2010/0171145 | A1 | 7/2010 | Morgan et al. |
| 2010/0213876 | A1 | 8/2010 | Adamson et al. |
| 2010/0234107 | A1 | 9/2010 | Fujimoto et al. |
| 2010/0277079 | A1 | 11/2010 | Van Der Veen et al. |
| 2010/0309016 | A1 | 12/2010 | Wendt et al. |
| 2010/0317437 | A1 | 12/2010 | Berry et al. |
| 2011/0035404 | A1 | 2/2011 | Morgan et al. |
| 2011/0045905 | A1 | 2/2011 | Radek |
| 2011/0050101 | A1 | 3/2011 | Bailey et al. |
| 2011/0070948 | A1 | 3/2011 | Bainbridge et al. |
| 2011/0118018 | A1 | 5/2011 | Toyoda |
| 2011/0118034 | A1 | 5/2011 | Jaffe et al. |
| 2011/0190052 | A1 | 8/2011 | Takeda et al. |
| 2012/0009995 | A1 | 1/2012 | Osgood |
| 2012/0040738 | A1 | 2/2012 | Lanning et al. |
| 2012/0122571 | A1 | 5/2012 | Desimone et al. |
| 2012/0178523 | A1 | 7/2012 | Greenberg et al. |
| 2012/0178528 | A1 | 7/2012 | Brunell et al. |
| 2013/0005458 | A1 | 1/2013 | Kosta et al. |
| 2013/0184078 | A1 | 7/2013 | Brunell et al. |
| 2013/0310178 | A1 | 11/2013 | Pryzby |
| 2014/0073430 | A1 | 3/2014 | Brunell et al. |
| 2014/0228121 | A1 | 8/2014 | Berry et al. |
| 2014/0228122 | A1 | 8/2014 | Berry et al. |
| 2014/0335956 | A1 | 11/2014 | Brunell et al. |

FOREIGN PATENT DOCUMENTS

| | | |
|---|---|---|
| WO | WO2004075128 | 9/2004 |
| WO | WO2004075129 | 9/2004 |
| WO | WO2004086320 | 10/2004 |
| WO | WO2005113089 | 12/2005 |
| WO | WO2005114598 | 12/2005 |
| WO | WO2005114599 | 12/2005 |
| WO | WO2005117647 | 12/2005 |
| WO | WO2006017444 | 2/2006 |
| WO | WO2006017445 | 2/2006 |
| WO | WO2006033941 | 3/2006 |
| WO | WO2006039284 | 4/2006 |
| WO | WO2006039323 | 4/2006 |

(56) References Cited

FOREIGN PATENT DOCUMENTS

| | | |
|---|---|---|
| WO | WO2006125013 | 11/2006 |
| WO | WO2007022294 | 2/2007 |
| WO | WO2007022343 | 2/2007 |
| WO | WO-2007061904 | 5/2007 |
| WO | WO2007133566 | 11/2007 |
| WO | WO2008057538 | 5/2008 |
| WO | WO2008063391 | 5/2008 |
| WO | WO2008137130 | 11/2008 |
| WO | WO2009054930 | 4/2009 |
| WO | WO2010048068 | 4/2010 |
| WO | WO-2011005797 | 1/2011 |
| WO | WO2011005798 | 1/2011 |
| WO | WO2011014760 | 2/2011 |
| ZA | 20041110 | 8/2005 |

OTHER PUBLICATIONS

"U.S. Appl. No. 12/965,749 Final Office Action", Apr. 22, 2013 , 30 Pages.
"U.S. Appl. No. 13/094,811 Office Action", Jun. 21, 2013 , 19 pages.
"U.S. Appl. No. 12/971,544 Office Action", Nov. 6, 2012 , 43 pages.
U.S. Appl. No. 13/204,225, filed Aug. 5, 2011, Caporusso, Vito M., et al.
"PCT Application No. PCT/US10/41111 International Preliminary Report on Patentability", Oct. 24, 2011 , 13 pages.
"PCT Application No. PCT/US10/41111 International Search Report", Sep. 1, 2010 , 12 pages.
"PCT Application No. PCT/US10/41112 International Preliminary Report on Patentability", Aug. 31, 2012 , 4 pages.
"U.S. Appl. No. 12/860,467 Office Action", Jan. 17, 2013 , 16 pages.
"U.S. Appl. No. 12/965,749 Office Action", Nov. 8, 2012 , 30 pages.
"U.S. Appl. No. 12/971,544 Final Office Action", Mar. 14, 2013 , 38 pages.
"U.S. Appl. No. 13/094,560 Office Action", Mar. 30, 2012 , 13 pages.
"U.S. Appl. No. 13/094,701 Final Office Action", Nov. 28, 2012 , 14 pages.
"U.S. Appl. No. 13/094,701 Office Action", Mar. 27, 2012 , 26 pages.
"U.S. Appl. No. 13/094,811 Office Action", Apr. 3, 2012 , 16 pages.
"U.S. Appl. No. 13/204,225 Office Action", Feb. 27, 2013 , 19 pages.
"U.S. Appl. No. 13/204,225 Office Action", Jun. 22, 2012 , 23 pages.
"U.S. Appl. No. 13/382,738 Office Action", Feb. 7, 2013 , 41 pages.
"U.S. Appl. No. 13/382,783 Office Action", Feb. 28, 2012 , 26 pages.
Gusella, Riccardo et al., "An Election Algorithm for a Distributed Clock SYnchronizaion Program", *Berkley* http://www.eecs.berkeley.edu/Pubs/TechRpts/1986/CSD-86-275.pdf Dec. 1985 , 19 pages.
U.S. Appl. No. 12/797,756, filed Jun. 10, 2010, Berry, Robert G., et al.
U.S. Appl. No. 12/530,467, filed Aug. 20, 2010, Radek, Paul J.
U.S. Appl. No. 12/965,749, filed Dec. 10, 2010, Brunell, Edward G., et al.
U.S. Appl. No. 12/971,544, filed Dec. 17, 2010, Brunell, Edward G., et al.
U.S. Appl. No. 13/094,701, filed Apr. 26, 2011, Brunell, Edward G., et al.
U.S. Appl. No. 13/094,811, filed Apr. 26, 2011, Brunell, Edward G., et al.
U.S. Appl. No. 13/109427, filed May 17, 2011, Brunell, Ed et al.
U.S. Appl. No. 13/094,560, filed Apr. 26, 2011, Brunell, Edward G., et al.
"PCT Application No. PCT/US10/41112 International Search Report", Sep. 2, 2010 , 11 pages.
"PCT Application No. PCT/US10/43886 International Search Report", Sep. 16, 2010 , 12 pages.
"U.S. Appl. No. 13/382,738 Office Action", Sep. 24, 2013 , 24 Pages.
"Coyote Moon", *IGT* http://web.archive.org/web/20131213220054/http://media.igt.com/marketi ng/Promotionalliterature/GamePromolit_111E3-29BC7.pdf 2005 , 2 pages.
"Elvis Little More Action", *24Hr-Slots* http://www.24hr-slots.co.uk!WagerWorks/Eivis_ALMA.html Sep. 5, 2009 , 4 pages.
"U.S. Appl. No. 12/797,756 Office Action", Nov. 7, 2013 , 7 Pages.
"U.S. Appl. No. 12/965,749 Office Action", Dec. 17, 2013 , 35 Pages.
"U.S. Appl. No. 13/094,560 Office Action", Dec. 6, 2013 , 9 Pages.
"U.S. Appl. No. 13/094,811 Final Office Action", Dec. 24, 2013 , 15 Pages.
NYPHINIX13, , "Star Wars Cloud City Slot Bonus—IGT", *YouTube* http://www.youtube.com/watch?v=wfYL9hjLxg4 Mar. 18, 2010 , 1 page.
U.S. Appl. No. 14/080,272, filed Nov. 14, 2013, Brunell, Edward G., et al.
"U.S. Appl. No. 12/965,749 Final Office Action", Apr. 30, 2014, 40 Pages.
"U.S. Appl. No. 13/094,560 Final Office Action", May 23, 2014, 9 Pages.
"U.S. Appl. No. 13/382,738 Final Office Action", Mar. 12, 2014, 23 Pages.
"U.S. Appl. No. 13/382,738 Final Office Action", Jul. 8, 2014, 20 Pages.
Co-Pending U.S. Appl. No. 14/254,656, filed Apr. 16, 2014, 63 pages.
Co-pending U.S. Appl. No. 14/446,081, filed Jul. 29, 2014, 40 Pages.
"U.S. Appl. No. 12/965,749 Office Action", Sep. 4, 2014, 33 Pages.
"U.S. Appl. No. 14/080,272 Office Action", Oct. 23, 2014, 5 Pages.

* cited by examiner

CONTROLLING CASINO LIGHTING CONTENT AND AUDIO CONTENT

RELATED APPLICATIONS

This application claims the priority benefit of U.S. Provisional Application Ser. No. 61/230,372 filed Jul. 31, 2009.

LIMITED COPYRIGHT WAIVER

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, control casino lighting content and audio content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a computer-implemented method comprises: receiving, at a casino content presentation device, lighting data from a network lighting controller; determining a light effect associated with the lighting data; presenting the light effect, on the casino content presentation device, according to a timed presentation pattern, wherein the timed presentation pattern is associated with a synchronized, casino-wide light show presentable on the casino content presentation device and on a plurality of additional casino content presentation devices in a casino; determining an accompanying sound effect associated with the lighting data, wherein the accompanying sound effect accompanies the light effect in the synchronized, casino-wide light show; and presenting the sound effect contemporaneously with the light effect as part of the synchronized, casino-wide light show.

In some embodiments, the computer-implemented method further comprises determining a light effect identifier included in the lighting data; referencing an audio playlist associated with the casino content presentation device that includes an entry for the light effect identifier; determining, from the audio play list, sound effect instructions associated with the light effect identifier; determining an audio file associated with the sound effect instructions; and playing the audio file on speakers associated with the casino content presentation device.

In some embodiments, the computer-implemented method further comprises determining a light effect identifier included in the lighting data; referencing a light effect playlist on the casino content presentation device that includes an entry for the light effect identifier; determining light effect instructions associated with the light effect identifier; and controlling emotive lighting devices on the casino content presentation device based on the light effect instructions.

In some embodiments, determining the accompanying sound effect associated with the lighting data comprises using the lighting data to determine audio presentation instructions associated with the lighting data, and automatically presenting the accompanying sound effect synchronously with the light effect based on the audio presentation data.

In some embodiments, the lighting data includes a light show identification number provided by the network lighting controller in response to a community wagering game event, and wherein the light show identification number identifies at least a portion of the synchronized, casino-wide light show.

In some embodiments, the casino content presentation device is one or more of a wagering game machine, a display on a wagering game machine, an emotive lighting device associated with a wagering game machine, a peripheral display device associated with a wagering game machine, a casino network lighting device, a spotlight, a light emitting diode device, a lighting panel, and a casino overhead lighting device.

In some embodiments, one or more machine-readable media having instructions stored thereon, which when executed by a set of one or more processors causes the set of one or more processors to perform operations comprising: receiving, at an emotive light controller associated with a wagering game machine, lighting data from a network lighting controller, wherein the emotive light controller and the network lighting controller are connected via a dedicated lighting network; determining a light effect identifier included in the lighting data; determining a light effect associated with the light effect identifier; presenting the light effect on an emotive lighting device controlled by the emotive light controller, according to a timed presentation pattern, wherein the timed presentation pattern is associated with a coordinated, casino-network light show presentable on the emotive lighting device and on a plurality of casino content presentation devices in a casino; determining a sound effect associated with the light effect identifier, wherein the sound effect accompanies the light effect in the coordinated, casino-network light show; and presenting, contemporaneously with the light effect, the sound effect, on speakers associated with the wagering game machine.

In some embodiments, said operation of determining the sound effect associated with the sound effect identifier includes operations comprises determining an audio file associated with the light effect identifier; determining sound effect presentation instructions associated with the light effect identifier; and playing the audio file, on the speakers associated with the wagering game machine, according to the sound effect presentation instructions.

In some embodiments, the network lighting controller is configured to send, exclusively, the lighting data from the network lighting controller.

In some embodiments, the operations further comprise using the lighting data to trigger gaming activity on the wagering game machine.

In some embodiments, the one or more machine-readable media the operations further comprises receiving the lighting data according to the timed presentation pattern for the coordinated, casino-network light show; and presenting the sound effect according to the timed presentation pattern.

In some embodiments, the one or more machine-readable media the operations further comprises determining presentation characteristics of the light effect; and presenting the sound effect in coordination with the presentation characteristics of the light effect.

In some embodiments, a system comprises: a network lighting controller configured to determine a casino-wide, multi-media show presentable across a plurality of casino-content presentation devices in a casino, wherein the casino-wide, multi-media show is related to a wagering game event for a community wagering game. The network lighting controller is also configured to determine channels assigned to the plurality of casino-content presentation devices, generate network lighting control data for the casino-wide, multi-media show, wherein the network lighting control data is configured with light show identification information for individual multi-media effects presentable on the plurality of casino-content presentation devices, and wherein the light show identification information is customized for each of the channels based on a presentation pattern for the community wagering game. The network lighting controller is further configured to provide the network lighting control data to the channels assigned to the plurality of casino-content presentation devices, via a dedicated lighting network. The system further comprises a gaming effects controller associated with at least one casino-content presentation device from the plurality of casino-content presentation devices, configured to receive the network lighting control data, identify a sound effect associated with the network lighting control data, and present the sound effect.

In some embodiments, the gaming effects controller is further configured to determine a light effect associated with the network lighting control data, and present the light effect, on the at least one casino-content presentation device, contemporaneously with the sound effect.

In some embodiments, the system further comprises a community wagering game server configured to provide the wagering game event for the community wagering game, determine that the at least one casino-content presentation device is associated with the community wagering game, and provide the network lighting control data to the gaming effects controller for the at least one casino-content presentation device because the at least one casino-content presentation device is associated with the community wagering game.

In some embodiments, the at least one casino-content presentation device is associated with a wagering game machine, and wherein the community wagering game server is further configured to determine a wagering game player account associated with the community wagering game, and determine that the wagering game player account is logged on to the wagering game machine associated with the at least one casino-content presentation device.

In some embodiments, the casino-wide, multi-media show is tied to functionality for the community wagering game.

In some embodiments, the dedicated lighting network is a DMX lighting network and wherein the network lighting data includes lighting show identification numbers.

In some embodiments, an apparatus comprises an emotive light controller configured to receive lighting data from a network lighting controller, determine a light effect associated with the lighting data, present the light effect on one or more emotive lighting devices according to presentation instructions for a casino-wide content presentation, wherein the casino-wide content presentation is presentable on a plurality of casino-content presentation devices in a casino. The apparatus also comprises a sound controller configured to determine a sound effect associated with the lighting data, wherein the sound effect correlates with the light effect for the casino-wide content presentation, and present the sound effect contemporaneously with the light effect as part of the casino-wide content presentation.

In some embodiments, the sound controller is further configured to determine presentation characteristics of the light effect, and present the sound effect in coordination with the presentation characteristics of the light effect.

In some embodiments, the presentation characteristics of the light effect comprise one or more of intensity, frequency, duration, and directionality of lighting content.

In some embodiments, an apparatus comprises: means for receiving lighting data from a network lighting controller, wherein the apparatus is connected to the network lighting controller via a dedicated lighting network; means for determining a light effect identifier included in the lighting data; means for accessing a computerized storage mechanism that includes a reference to the light effect identifier; means for determining light effect presentation instructions associated with the reference to the light effect identifier; means for presenting a light effect on one or more emotive lighting devices according to the light effect presentation instructions; means for determining sound effect presentation instructions associated with reference to the light effect identifier; and means for presenting a sound effect, contemporaneously with the light effect, according to the sound effect presentation instructions.

In some embodiments, the computerized storage mechanism includes one or more light effect playlists and sound effect playlists that are associated with each other via the reference to the light effect identifier.

In some embodiments, the network lighting controller is a DMX lighting controller.

In some embodiments, the lighting data is associated with a wagering game event that controls a wagering game presentation across a plurality of presentation devices in a casino and wherein the apparatus is associated with at least one of the plurality of presentation devices.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1A:
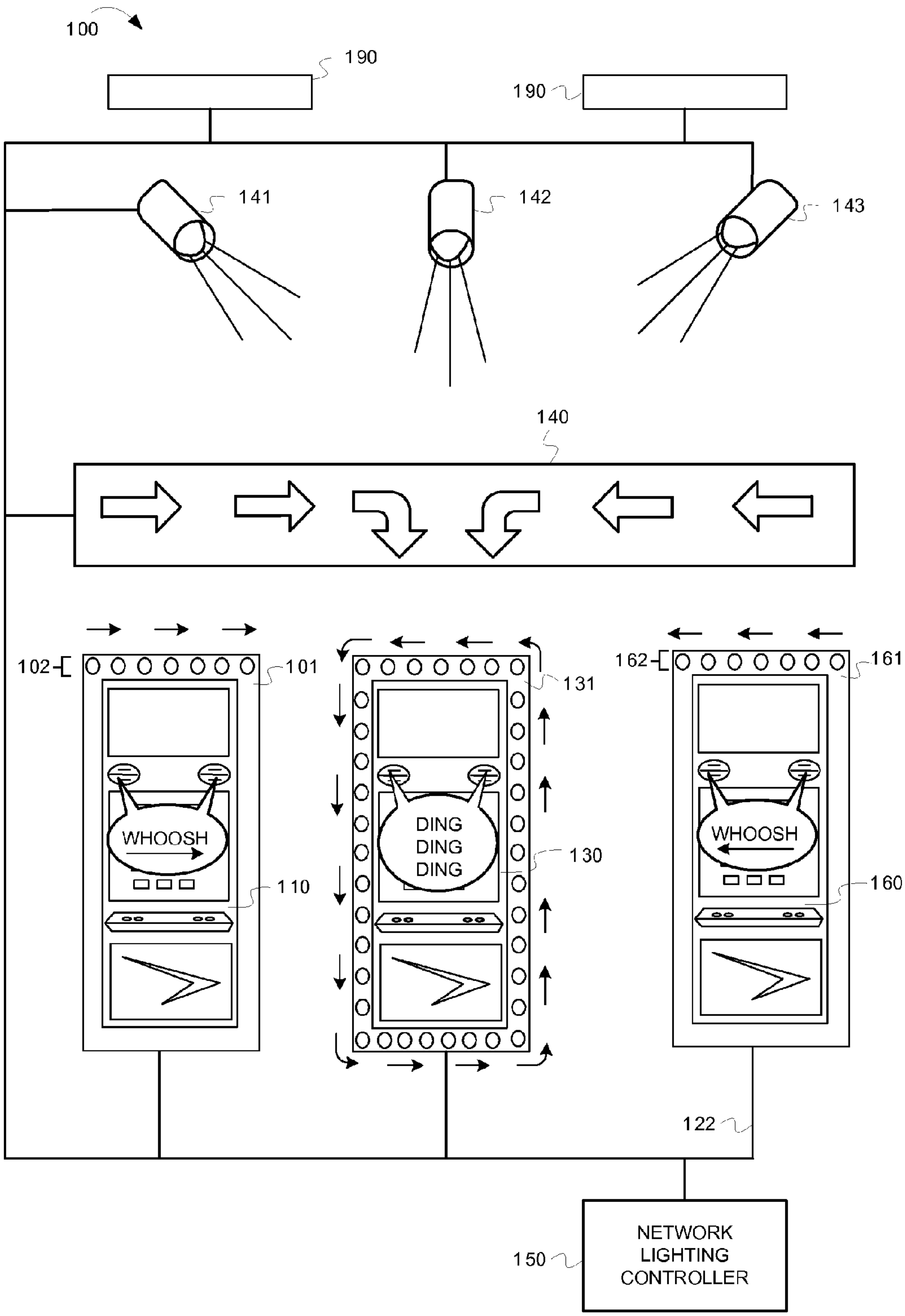
FIGS. 1A and 1B are illustrations of coordinating wagering game light and sound content, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Many computerized wagering game systems have a variety of sound and graphical elements designed to attract and keep a game player's attention, such as sound effects, music, and animation. These game presentation features often include a variety of music, sound effects, and voices presented to complement a visual (e.g., video, computer animated, mechanical, etc.) presentation of the wagering game on a display. Sound presentation, therefore, can greatly enhance a wagering game player's gaming experience. Some gaming developers, however, have encountered challenges in reliably timing and presenting sounds across distances that span multiple machines such as for a bank attract light show (e.g., a light presentation that spans over several wagering game machines to attract attention to the bank of machines). For example, timing issues, packet collisions, data processing, and other issues can present an unreliable sound quality and timing. The challenge of reliably presenting sound across a bank of machines becomes magnified for sound presentation across larger areas, such as an entire casino floor. Because gambling is associated with money, sound reliability becomes even more critical when it involves presenting gaming outcomes. For example, if sound production is unreliable, sounds that accompany casino-wide game activity may confuse or cause misunderstandings among gaming patrons as to what patrons should do to participate in large-scale gaming activity, who won casino-wide games, where patrons should go to collect money, etc. Unreliable sound production, therefore, can discourage gaming operators from using sound to present casino-wide wagering game activity.

Some embodiments of the inventive subject matter, however, describe examples of presenting reliably coordinated light and sound across multiple machines casino-wide. For example, some embodiments can trigger wagering game audio effects using lighting commands that come from theatrical lighting controllers. In some embodiments, the triggered audio can correlate with characteristics of the light effects that convey wagering game activity, celebratory effects, background lighting, ambience lighting, theme lighting, etc.

Embodiments can be presented over any type of communications network (e.g., public or private) that provides access to wagering games. Multiple users can be connected to the networks via computing devices, such as wagering game machines. The multiple users can have accounts that subscribe to specific services, such as account-based wagering systems (e.g., account-based wagering game websites, account-based casino networks, etc.). In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling".

Figure 1B:
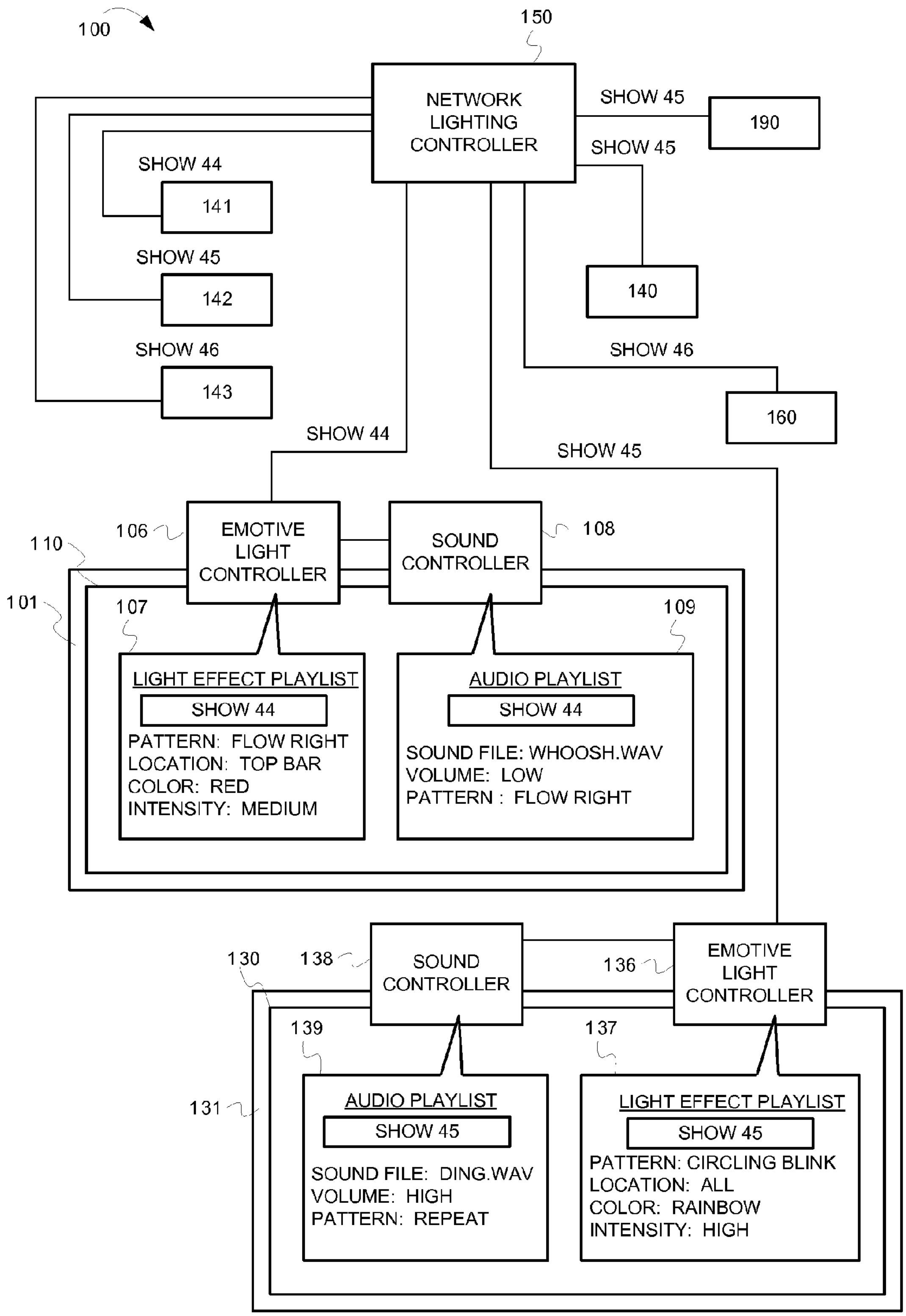

FIGS. 1A and 1B are illustrations of coordinating wagering game light and sound content, according to some embodiments. In FIG. 1A, a wagering game system ("system") 100 includes multiple wagering game machines (e.g., wagering game machine 110, 130, 160). The system 100 also includes a light show display panel 140 that spans large sections of a casino. The system 100 also includes directional lighting (e.g., spot lights 141, 142, 143) and other lighting display devices (e.g., overhead lighting 190, and other casino-lighting devices not shown) that are part of a casino's lighting equipment. The wagering game machines 110, 130, 160, the light show display panel 140, the spot lights 141, 142, 143, and other devices (e.g., overhead lighting 190), are connected to a dedicated lighting network 122 that is dedicated to transmitting lighting data (e.g., lighting commands and instructions). A network lighting controller 150 can provide lighting data via the dedicated lighting network 122. The dedicated lighting network 122 can transmit information uni-directionally, and asynchronously, without special processing (e.g., without automatic error checking and correction), via a lighting communications protocol used specifically to control stage lighting and lighting special effects. One such lighting communications protocol is the DMX512-A (DMX) protocol, an asynchronous, serial, digital data transmission standard for controlling lighting equipment and accessories. The dedicated lighting network 122 transmits the lighting information instantaneously and directly (e.g., asynchronously, uni-directionally, without conflicts, without packet collisions, without packet processing, etc.) to connected devices (e.g., the wagering game machines 110, 130, 160, the light show display panel 140, the spot lights 141, 142, 143, the overhead lighting 190, etc.). The connected devices can receive the lighting information simultaneously from the network lighting controller 150.

The wagering game machines 110, 130, 160 can include emotive lighting devices 101, 131, 161 utilized to present light effects. Examples of emotive lighting devices can include light emitting display (LED) bars attached to a wagering game machine cabinet, lights on a cabinet top-box, marquee lights, chair lighting, reel illuminator lights, etc. The wagering game machines 110, 130, 160 may be grouped together in a bank. The network lighting controller 150 can synchronize coordinated light shows on the emotive light devices 101, 131, 161. In some embodiments, the system 100 triggers sound content associated with lighting data provided from the network lighting controller 150. In other words, a lighting command triggers a sound effect. The sound content can include sound effects tied to, or closely associated with light effects (e.g., emotive light shows). The network lighting controller 150 can transmit lighting commands at a fixed rate so that lighting timing is precise. All of the lighting devices that receive the lighting commands (e.g., the emotive lighting devices 101, 131, 161 on the wagering game machines 110, 130, 160, the light show display panel 140, the spot lights 141, 142, 143, and the overhead lighting 190) can contemporaneously react with light effects. The lighting devices can each include a local lighting controller that sees the lighting commands and reacts to them based on various factors including the properties of the devices (e.g., location, state, etc.), timing of the lighting commands, etc. The lighting devices that have associated sound production devices can have sound scripts, or audio playlists, which refer to sound content associated with the light effects. For instance, the wagering game machines 110, 130, 160, can have audio playlists that match up to lighting data presented via the dedicated lighting network 122. A local sound controller can receive the lighting commands from the dedicated lighting network 122 and play sounds that accompany a light effect. The system 100 thus can invoke canned audio on the wagering game machines 110, 130, 160 based on triggering data presented from the network lighting controller 150. For example, in FIG. 1A, a jackpot win produces a light show. Specifically, a player account that is using the wagering game machine 130 may have hit a progressive bonus, or won some other network gaming award, which the casino desires to celebrate in a highly noticeable way. Thus, the network lighting controller 150 sends lighting commands to each of the lighting devices to produce a coordinated light show. Specifically, the network lighting controller 150 sends a first lighting command (e.g., in FIG. 1B, the network lighting controller 150 sends a light show number 45) to the overhead lighting 190 to shut off or dim. The network lighting controller 150 sends second, third and fourth lighting commands, at the same time as the first lighting command, to the spot lights 141, 142, and 143, respectively, to turn on and point toward the wagering game machine 130 (e.g., in FIG. 1B, the network lighting controller 150 sends light show numbers 44, 45, and 46 to each of the spot lights 141, 142, and 143, which each of the spot lights 141, 142, and 143 can interpret to point in the proper direction at the wagering game machine 130). The network lighting controller 150 sends a fifth lighting command (e.g., in FIG. 1B, the network lighting controller 150 sends the light show number 45), at the same time as the other commands, to the light show display panel 140 to produce arrow images that highlight the wagering game machine 130. At the same time, the network lighting controller 150 sends sixth, seventh, and eight lighting commands to the wagering game machines 110, 130, and 160 respectively. The sixth lighting command, received by the wagering game machine 110, instructs the emotive light devices 101 to play on a top light bar 102 to create a light effect that appears to move in the direction of the wagering game machine 130. For example, in FIG. 1B, the network lighting controller 150 sends the light show number 44 to the emotive light controller 106 of wagering game machine 110. The emotive light controller 106 can reference a light effect playlist 107 that indicates instructions when a specific show number is received (e.g., when show number 44 is received, the light effect playlist 107 indicates instructions to present a right flowing, red-lit effect on the top bar 102 with a medium light intensity). The eighth lighting command, received by the wagering game machine 160, instructs the emotive light devices 161 on a top light bar 162 to also create a light effect that appears to move in the direction of the wagering game machine 130, although the direction of the movement is opposite to the direction of movement for light effect on the wagering game machine 110. The network lighting controller 150 knows the location of the wagering game machines 110 and 160 in relation to wagering game machine 130 and sends appropriate lighting commands. For example, in FIG. 1B, the network lighting controller 150 sent the light show number 44 to the emotive light controller 106 to create, as shown in FIG. 1A, the right flowing, red-lit effect on the top bar 102. At the same time, however, the network lighting controller 150, in FIG. 1B, sends the light show number 46 to the wagering game machine 160 to create, as shown in FIG. 1A, a left flowing, red-lit effect on the top bar 162. The wagering game machine 130 receives the seventh lighting command, which instructs the emotive light devices 131 to create a circling light pattern around the wagering game machine 130. For example, in FIG. 1B, the network lighting controller 150 sends the light show number 45 to an emotive light controller 136 to create, as shown in FIG. 1A, the circling light pattern. In FIG. 1B, when the emotive light controller 136, for wagering game machine 130, receives the show number 45, a light effect playlist 137 indicates instructions to present a circling, blinking, rainbow colored light effect with a high light intensity.

The wagering game machines 110, 130 and 160 also have audio playlists that recognize the sixth, seventh and eighth lighting commands and react with appropriate sound content. For example, referring specifically to FIG. 1B, the wagering game machine 110 includes a sound controller 108 that references an audio playlist 109. The audio playlist 109 indicates audio instructions related to show number 44, including a sound file name (e.g., "whoosh.wav"), a volume level setting (e.g., "low"), and a directionality or pattern (e.g., "flow right"). The directionality of the sound coordinates with the directionality of the light effect (e.g., the right flowing light effect) on the top bar 102. For example, referring specifically to FIG. 1A, the speakers on the wagering game machine 110 can present a stereo type sound that appears to audibly move from left to right toward wagering game machine 130. Returning to FIG. 1B, in one embodiment, the sound controller 108 for the wagering game machine 110 can control the volume of the right-flowing sound so that only a person at the wagering game machine 110 can hear it. In other embodiments, however, the network lighting controller 150 and the sound controller 108 can work in concert to present a synchronized sound presentation at the wagering game machine 110 and at the wagering game machine 160, that is loud enough, and that repeats in synchronicity, so that a distant observer could hear bank-level directional sound that appears to move toward the wagering game machine 130. At the same time, referring specifically to FIG. 1B, the wagering game machine 130 includes a sound controller 138 that references an audio playlist 139. The audio playlist 139 indicates sound instructions related to show number 45, including a sound file name (e.g., "ding.wav"), a volume level setting (e.g., "high"), and a directionality or pattern (e.g., "repeat"). The sound content for show 45, indicated in the audio playlist 139, matches in function, or purpose, the light effect for show 45 indicated in the light effect playlist 137 (e.g., presents a loud repeating celebratory sound of congratulations, that comports with the celebratory light effect of circling, blinking, rainbow colored light on the emotive lighting devices 131 on the wagering game machine 130).

Although FIGS. 1A and 1B describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
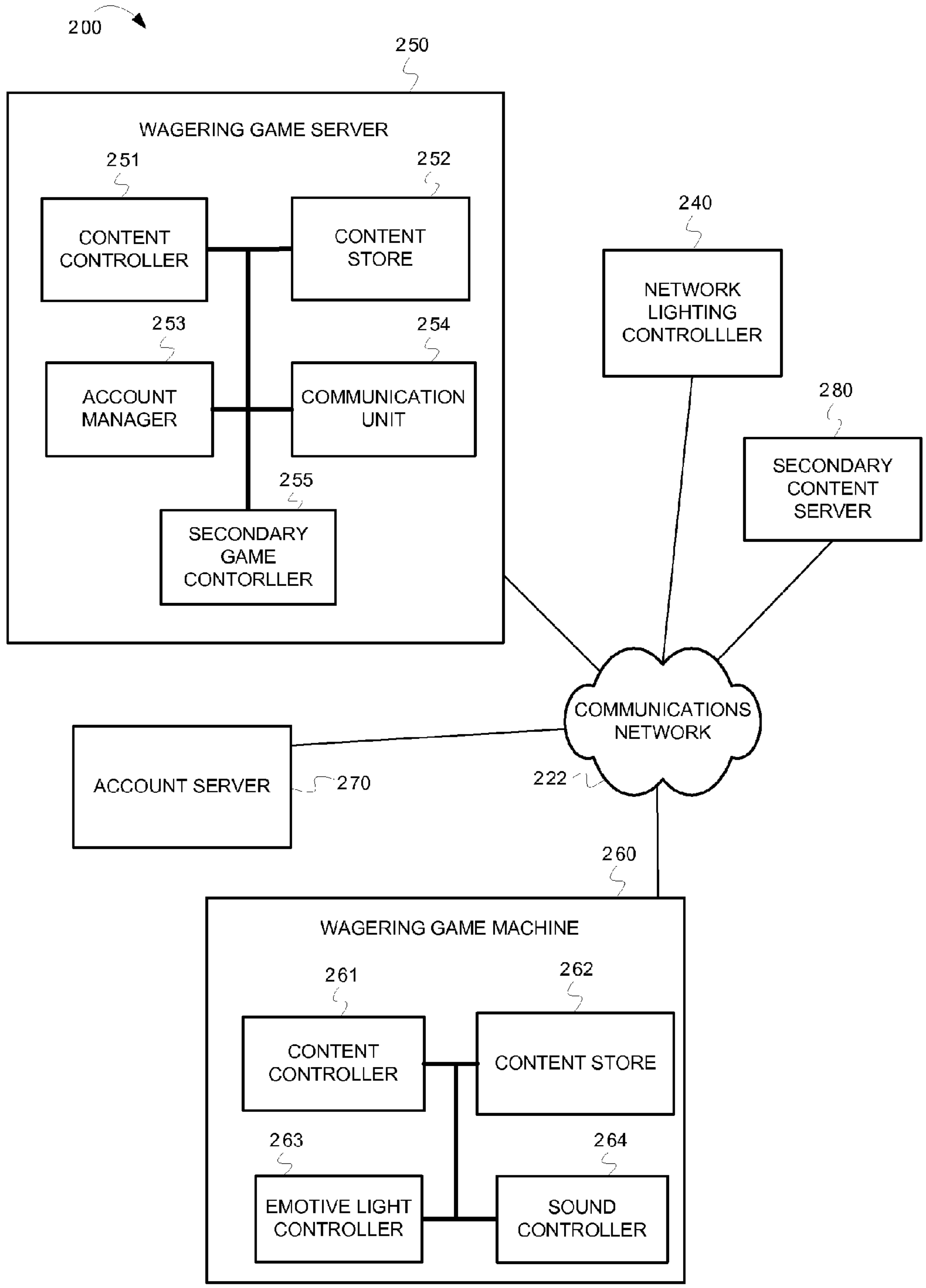
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include a secondary game controller 255 configured to control secondary game communications, content, and other information including, but not limited to, information about community wagering games.

The wagering game system architecture 200 can also include a wagering game machine 260 configured to present wagering games and receive and transmit information to control casino lighting content and sound. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can be associated with an emotive light controller 263 configured to control communications including casino-content lighting control data. In some embodiments, the emotive light controller 263 can be included in the wagering game machine 260. In other embodiments, the emotive light controller 263 is associated with the wagering game machine 260, though not necessarily integral with, or included in, the wagering game machine 260. For example, in some embodiments, the emotive light controller 263 may be connected to, and control, emotive lighting devices that are attached to a cabinet for the wagering game machine 260, or that are proximate to, the wagering game machine 260. The wagering game machine 260 can also be associated with a sound controller 264 configured to determine sound content associated with casino-content lighting control data and present the sound content contemporaneously with (e.g., in synchronicity with, in direct connection with, immediately following) a presentation of casino lighting content. In some embodiments, the sound controller 260 also may be included in the wagering game machine 260. In other embodiments, however, the sound controller 260 may be associated with, but not necessarily a part of, the wagering game machine 260.

The wagering game system architecture 200 can also include a network lighting controller 240 configured to control environmental light presentation devices within a casino. The network lighting controller 240 can provide emotive lighting presentation data, including light presentation commands on emotive lighting devices on or near wagering game machines, as well as other devices within the casino such as spotlights, overhead emotive lighting, projectors, etc. The network lighting controller 240 can be configured to determine multi-media, casino-content, including casino-wide special effects that include sound effects and light effects. The multi-media casino content can be presentable across a plurality of casino content presentation devices ("presentation devices") in a casino. The multi-media, casino-content effect can be related to a wagering game presentation or event. The wagering game presentation or event can be tied to the functionality, activity, or purpose of a wagering game. For instance, wagering game presentations can be related to attracting wagering game players to groups of wagering game machines, presenting game related outcomes across multiple wagering game machines, expressing group gaming activity across multiple wagering game machines, focusing attention on a particular person or machine in response to a gaming event, etc. FIGS. 1A, 1B, 4A, 4B and 5, illustrate some examples of presentation devices that present sound and light effects that accompany a gaming event (e.g., a jackpot celebratory effect that focuses on a wagering game machine, a lightning strike that introduces a community gaming event, and a musical chair game that reveals a community wagering game winner). The network lighting controller 240 can also be configured to determine timing control data for the multi-media effect. In some embodiments, timing control data can be stored on the network lighting controller 240, or be accessible to the network lighting controller 240, to use to send lighting commands in sequential order to network addresses of presentation device on a casino network. The network lighting controller 240 can determine channels assigned with casino-content presentation devices, such as the wagering game machine 260. In some embodiments, the presentation devices can have an addresses assigned to a channel. For example, the wagering game machine 260 could be on one channel, peripheral devices could be on another channel, network light presentation devices can be on other channels, etc. In some embodiments, the network lighting controller 240 can be a DMX controller connected in parallel to the emotive lighting controller 263 on the wagering game machine 160. The DMX controller can also be connected in parallel to a plurality of other presentation devices (e.g., other wagering game machines, lighting presentation devices, etc.) within a casino, and can simultaneously provide DMX lighting commands to the wagering game machine 260 and to the other presentation devices. DMX can change light intensity, or other light characteristics, over time. Some embodiments of DMX controllers can update commands very quickly (e.g., 30-47 times a second) across multiple channels (e.g., 512 channels). A DMX controller can put different commands in every channel (e.g., one channel can have show 12, one channel can show 11, etc.). The DMX can also have a frame number within a show. Some devices can take up more than one channel (e.g., an emotive light might have three colors and may take up a channel for each color, a spotlight might have seven channels, etc.). Each device can receive 512 bytes of data from the DMX controller at any given time interval (e.g., frame). The 512 bytes of data can be divided in different ways. For example, 6 bytes may address light effect behavior, 6 bytes may include show numbers, 6 bytes may include frame numbers, 1 byte may include priority values, and so on for various light effect characteristics (e.g., intensity, color, pan, tilt, etc.). The presentation device that receives the DMX command data is programmed to interpret the lighting data in the channel. In some embodiments, the presentation devices can be DMX compliant including having a DMX input port to accept DMX commands. In some embodiments, presentation devices can convert the DMX commands to proprietary commands. In addition to the DMX protocol, other types of dedicated lighting protocols can include AMX 192, CMX, SMX, PMX, protocols included in the EIA-485 standard, etc.

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. The secondary content server 280 can include one or more different servers or devices including a secondary game server (e.g., a bonus game server, etc.), a network game server (e.g., a progressive game server, a big event server), an advertising server, a community game server, etc. The secondary content server 280 can provide and control content for community games, including networked games, social games, competitive games, or any other game that multiple players can participate in at the same time.

Each component shown in the wagering game system architecture 200 is shown as a separate and distinct element connected via a communications network 222. However, some functions performed by one component could be performed by other components. For example, the wagering game server 250 can also be configured to perform functions of the emotive light controller 263, the sound controller 264, and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260 can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
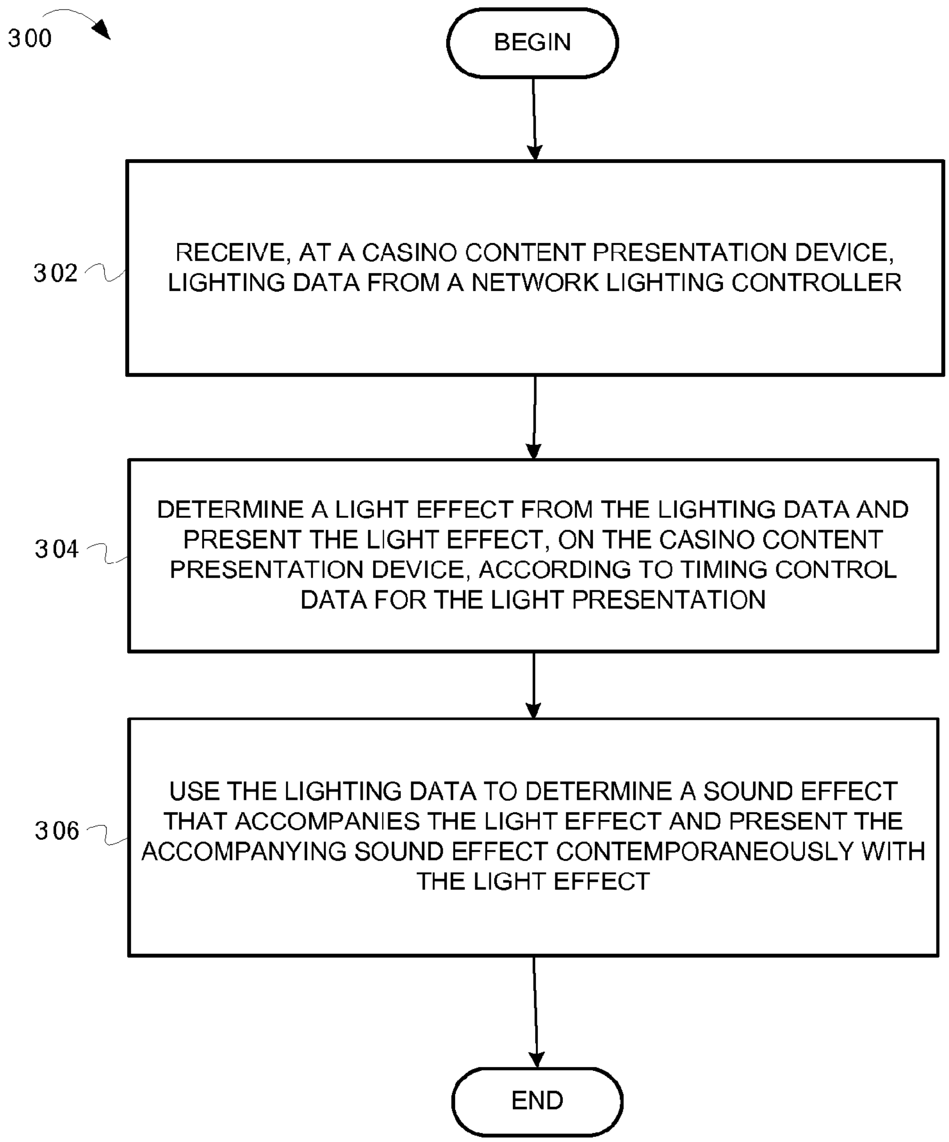
FIG. 3 is a flow diagram illustrating coordinating sound content to gaming light effects, according to some embodiments.

FIG. 3 is a flow diagram ("flow") 300 illustrating coordinating sound content to gaming light effects, according to some embodiments. FIGS. 1A, 1B, 4A, 4B, and 5 are conceptual diagrams that help illustrate the flow 300 of FIG. 3, according to some embodiments. This description will present FIG. 3 in concert with FIGS. 1A, 1B, 4A, 4B, and 5. In FIG. 3, the flow 300 begins at processing block 302, where a wagering game system ("system"), including a casino-content presentation device ("presentation device"), receives lighting data from a network lighting controller. The network lighting controller can be a casino-wide lighting controller, such as a DMX lighting controller that generates and provides the lighting data to the presentation device. The lighting data can include a show identification number and frame number (e.g., as described above in FIGS. 1A and 1B), which the casino-wide lighting controller can provide to the presentation device via a dedicated lighting network. In some embodiments, the network lighting controller can be a lighting controller for a bank of wagering game machines. For example, in FIGS. 1A and 1B, the wagering game machines 110, 130, 160 can include communications devices (e.g., peer-to-peer network communication mechanisms) that allow the wagering game machines 110, 130, 160 to communicate with each other at a bank level to present synchronized bank content, including bank-level emotive light shows. In some embodiments, the system can include both a casino-wide network lighting controller and a bank-level network lighting controller, from which the presentation device can receive the lighting data. The presentation device can be a wagering game machine, a peripheral display, an overhead lighting device, a spotlight, a light emitting diode (LED) panel, a digital display, or any other device in a casino that presents light effects. FIG. 1A for example, illustrates examples of many different presentation devices including the wagering game machines 110, 130, 160, the light show display panel 140, the spot lights 141, 142, 143, and the overhead lighting 190. The presentation device can associate the lighting data with a light effect, accessible to the presentation device (e.g., via instructions stored on the presentation device to produce the light effect).

Figure 4A:
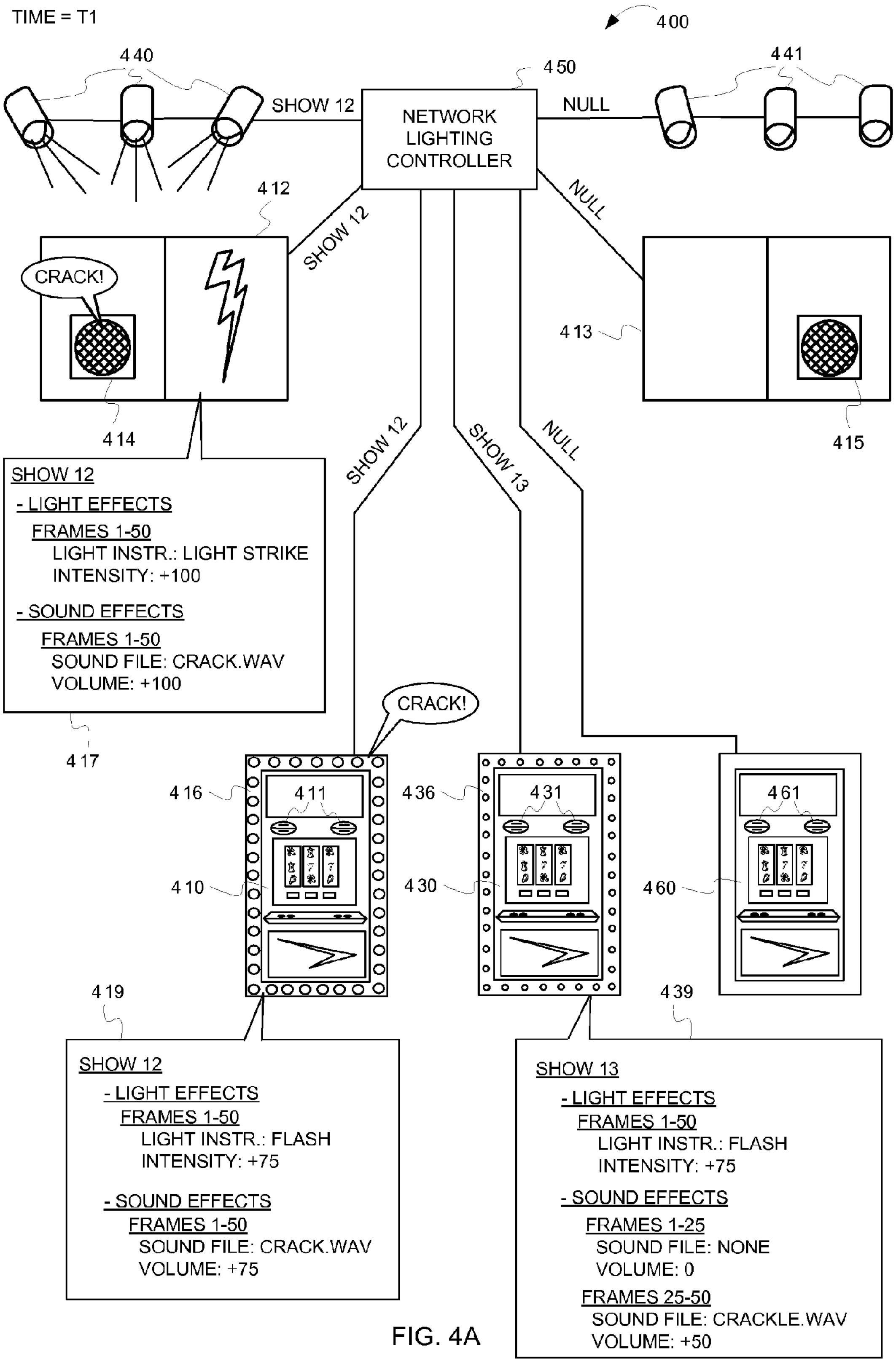
FIGS. 4A and 4B are illustrations of coordinating sound effects on network devices for casino-wide lighting content, according to some embodiments.
Figure 4B:
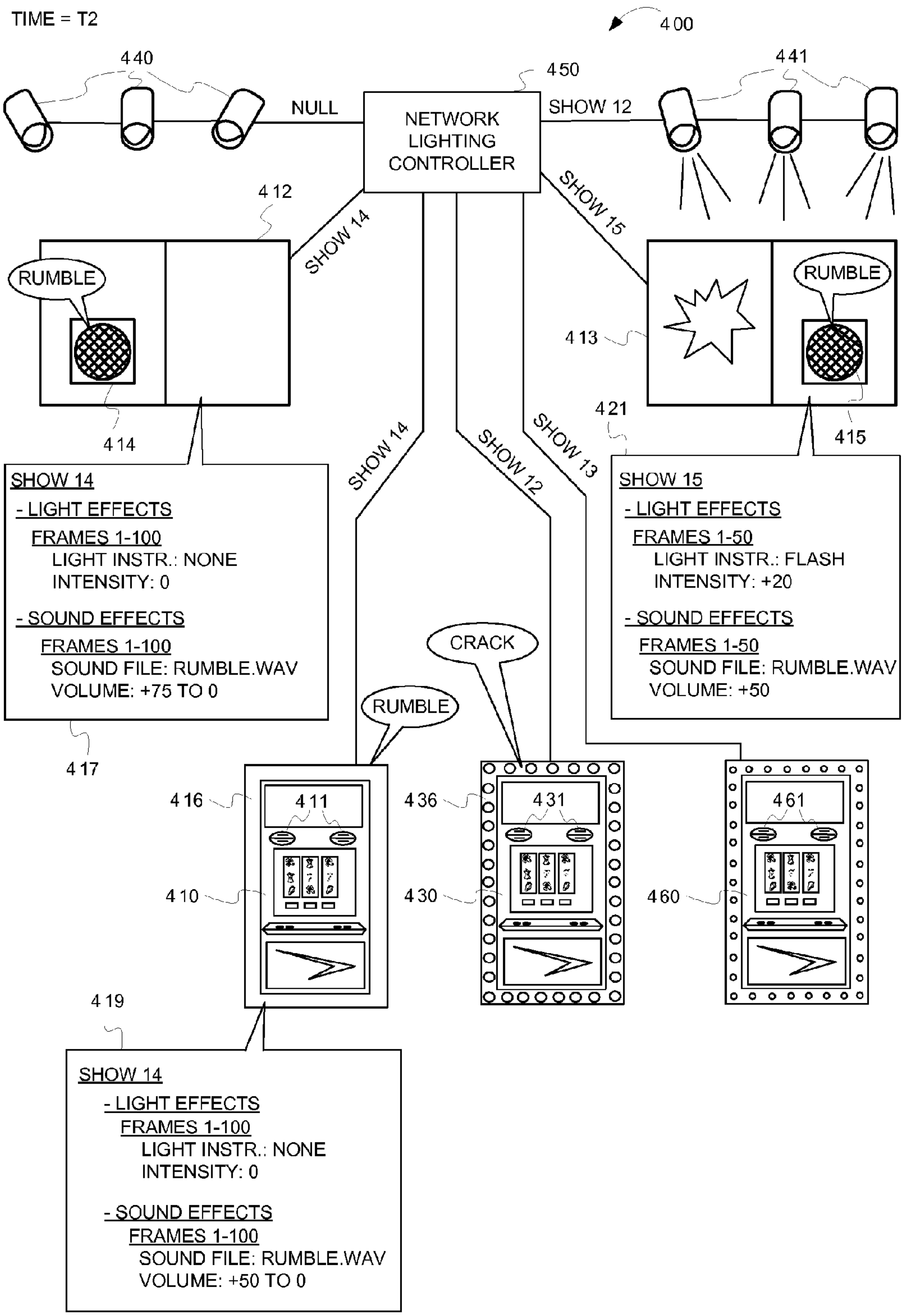
Figure 5:
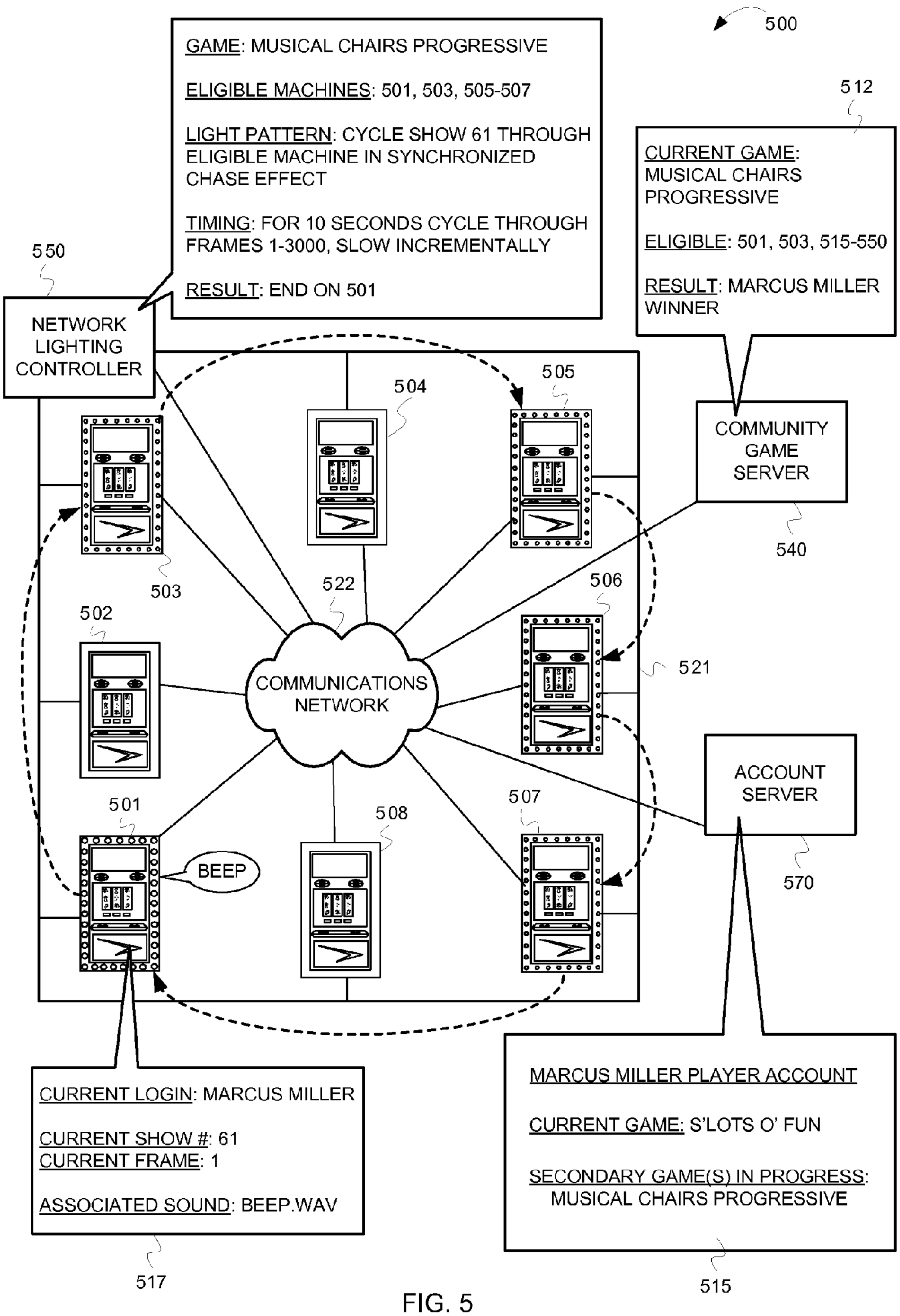
FIG. 5 is an illustration of coordinating lighting content and sound content for network wagering games, according to some embodiments.

FIGS. 4A, 4B and 5 illustrate examples of light effects associated with wagering game activity. For example, FIGS. 4A and 4B illustrates a "lightning strike" light effect that spans a large section of a casino. The "lightning strike" light effect is associated with a casino-wide celebratory effect for a group or community game, such as a progressive jackpot wagering game. FIG. 5 illustrates a musical-chair type "chase" light effect that cycles through a group of eligible wagering game machines participating in a group or community game that lights up wagering game machines one at a time, until stopping on a single wagering game machine. The wagering game machine upon which the light cycle stops wins the community wagering game.

In FIGS. 4A and 4B, a wagering game system ("system") 400 includes a network lighting controller 450 and a multitude of presentation devices including wagering game machines 410, 430, 460, theatrical lighting panels 412, 413, and theatrical spotlights 440, 441. The network lighting controller 450 provides lighting commands to the presentation devices. Some of the presentation devices include audio devices including overhead speakers 414, 415 (associated respectively with theatrical lighting panels 412 and 413), and speakers 411, 431, and 461 (associated respectively with wagering game machines 410, 430, and 460). In some embodiments, the speakers 414 and 415 can be connected, or integrated with, the theatrical lighting panels 412, 413 as a unit. In other embodiments, however, the speakers 414 and 415 can be separate from the theatrical lighting panels 412 and 413 (though still associated with the theatrical lighting panels 412 and 413) and can have their own emotive light controllers that can receive lighting data and interpret it to produce sound. The network lighting controller 450 sends show numbers to the presentation devices in a synchronized pattern giving the impression of a lightning strike that appears to strike one point in a casino (i.e., on the theatrical lighting panel 412 and spotlights 440 at time t1 in FIG. 4A). The lightning strike effect also includes light effects that appear to expand outward from the central striking point. For example, in FIG. 4A, at time t1, light effects appear on wagering game machines 410 and 430 (e.g., on emotive lighting devices 416 and 436 associated, respectively, with wagering game machines 410 and 430). Then, in FIG. 4B, at time t2, light effects appear on wagering game machines 430, 460 (e.g., on emotive lighting devices 436 and 466 associated, respectively, with wagering game machines 430 and 460), on spotlights 441, and on the theatrical lighting panel 413 giving the impression that the flash from the lightning strike is traveling outward away from the striking point. FIGS. 4A and 4B are described in further detail below, illustrating how the system 400 can coordinate sound effects with the lightning strike light effect.

In FIG. 5, a wagering game system ("system") 500 includes a network lighting controller 550, a community game server 540, an account server 570, and several wagering game machines 501, 502, 503, 504, 505, 506, 507, and 508 ("wagering game machines 501-508"). The network lighting controller 550 is connected directly, via a dedicated lighting network 521, to the wagering game machines 501-508. The network lighting controller 550 and the wagering game machines 501-508 are also connected to a communication network 522. The community game server 540 and the account server 570 are also connected to the communication network 522. The account server 570 can communicate player account data to and from the wagering game machines 501-508 and the community game server 540. For example, at wagering game machine 501 a player account 515 is logged in for a casino patron (e.g., "Marcus Miller"). The community game server 540 can provide information to the network lighting controller 550 about a musical-chair type progressive game ("community game") 512, for which the player account 515 is eligible. Other player accounts at wagering game machines 503, 505, 506, and 507 are also eligible for the community game 512. The network lighting controller 550 can present a coordinated chase effect, or similar type of light effect, associated with the community game 512, that reveals a winner for the community game 512 by cycling a light effect through eligible wagering game machines 501, 503, and 505-507. FIG. 5 will be described in further detail below illustrating how the system 500 can coordinate sound effects with the chase light effect.

Returning to FIG. 3, the flow 300 continues at processing block 304, where the system determines a light effect from the lighting data and presents the light effect, on the casino content presentation device, according to timing control data for the light presentation. In some embodiments, the timing control data is stored on a network lighting controller, which sends lighting commands to presentation devices in a timed sequence. For example, in FIGS. 4A and 4B the network lighting controller 450 generates show numbers and frame numbers in a proper sequence, according to stored timing data, to coordinate the presentation of the lightning strike lighting. Each presentation device in the system 400 can have a unique address. The network lighting controller 450 can send the show numbers and frame numbers to each presentation device at its address at the proper time to initiate a light presentation. The system 400 connects the presentation devices with a dedicated lighting network, such as the DMX lighting network, which has limited data processing and little, if any, communication data other than lighting presentation commands and data (e.g., limited exclusively, in some examples, to lighting show numbers and frame numbers). For example, at time t1 in FIG. 4A, the network lighting controller 450 sends a show number (e.g., show number 12) to the spotlights 440, the theatrical lighting panel 412, and the wagering game machine 410. The show number "12" is a show number that indicates to lighting devices to perform an effect associated with the initial lightning strike, such a bright-light-flash effect. The network lighting controller 450 knows that the theatrical lighting panel 412 will be the center point for the lightning strike. For example, a community game server or wagering game server may have provided that information to the network lighting controller 450 and instructed it to present a lightning-strike show starting at a network address associated with the theatrical lighting panel 412. The network lighting controller 450 can be configured to thus send the show number 12 (i.e., the show number for the "strike" or "flash" in the lightning strike show) to the theatrical lighting panel 412. The network lighting controller 450 may also know, according to configuration or timing data for the lightning strike show, to send the show number 12 to the nearby spotlights 440 and wagering game machine 410. At the same time, t1, the network lighting controller 450 sends a show number 13 to the wagering game machine 430. The show number 13 may evoke a light effect that is a different type of light effect (e.g., different light intensity, different presentation pattern, etc.) than the light effect evoked by show number 12 on the wagering game machine 410. The network lighting controller 450 relies on the presentation devices to interpret what the show numbers mean and therefore can, in some embodiments, limit sent data to strictly show numbers and frame numbers. For instance, in some embodiments, presentation devices can store configuration files, or some other form of computerized storage mechanism (e.g., database records, libraries, game settings, etc.) that include lighting scripts, or light effect playlists, that reference particular show numbers and frame numbers. The light effect playlists can be associated with show numbers and frame numbers provided in the lighting data. The presentation devices can monitor the show numbers and frame numbers from the lighting data and activate the light effect playlists to play the light effects on emotive lighting devices or other light presentation devices. The presentation devices can have the show numbers and frame numbers stored in the configuration files (e.g., in the light effect playlists). When the presentation device receives the lighting data, the presentation device can reference the light effect playlists to determine how to present light shows on emotive lighting devices associated with the presentation device. As the same time, the presentation devices can reference audio playlists to determine how to present sound shows that accompany (e.g., are closely tied to) the light shows (described further below in conjunction with processing block 306). In FIG. 4A, at time t1, the wagering game machine 410 and the theatrical light panel 412 receive the show number 12. The theatrical light panel 412 refers to a show configuration file 417 that references the show number 12 and indicates that for frames 1-50, the theatrical light panel 412 should play a "light flash" light effect at an intensity level of "+100." At the same time t1, the wagering game machine 410 refers to a show configuration file 419 that references the show number 12 and indicates that for frames 1-50, emotive lighting devices 416 should present a "light flash" light effect at an intensity level of "+75." The wagering game machine 430, also at time t1, receives the show number 13. The wagering game machine 430 refers to a show configuration file 439 that references the show number 13 and indicates that for frames 1-50, emotive lighting devices 436 should present a "light flash" effect at an intensity level of "+65," which is different (e.g., dimmer) than the light effect at wagering game machine 410. The network lighting controller 450 can also send null data, or in some cases no data, to other presentation devices that do not have to present a light effect yet (e.g., the wagering game machine 460, the theatrical lighting panel 413, and the spotlights 441 at time t1). In some embodiments, the null data may include null light show values, but may include preparation data to prepare the unlit presentation devices (e.g., the wagering game machine 460, the theatrical lighting panel 413, and the spotlights 441 at time t1) to receive upcoming data, for instance, so that the unlit presentation device can queue up content, such as sound content, to present with lighting data. Later, as the lightning strike light effect progresses, such as at time t2, in FIG. 4B, the network lighting controller 450 shifts the light effect geographically to the right by sending show number 12 to the wagering game machine 430 and to the spotlights 441 to convey the sense of movement of light across the casino floor outward from the central lightning-strike point. The network lighting controller 450 can, at the same time t2, send show number 13 to the wagering game machine 460 to present the same light effect as wagering game machine 430 did at time t1, again shifting the light effects to the right. The wagering game machine 460 (or emotive lighting controller associated with wagering game machine 460) can light the emotive lighting devices 466 to be dimmer than the emotive lighting devices 436 on wagering game machine 430. The network lighting controller 450 also sends a show number 15 to the theatrical lighting panel 413, which the theatrical lighting panel 413 interprets to present a light effect that is dimmer than the original lightning strike effect presented on the theatrical lighting panel 412 at time t1. At time t2, the theatrical lighting panel 413 can reference a show configuration file 421, which indicates that during frames 1 to 50 the theatrical lighting panel 413 should present a "flash" light effect at an intensity of "+20." The network lighting controller 450 further sends show number 14 to the theatrical lighting panel 412, and the wagering game machine 410. The show number 14 may be interpreted by the theatrical light panel 412 and the wagering game machine 410 to not present any light effects (as the initial lightning strike effect has already occurred). However, the show number 14 may be interpreted to present sound content on the speakers 411 and the speaker 414, which will be described further below at processing block 306. Further, any of the light show numbers can trigger audio on any of the presentation devices that are equipped to produce sound, which will also be described at processing block 306.

In FIG. 5, the network lighting controller 550 can also present lighting data in the proper sequence to the presentation devices in the system 500. For example, the network lighting controller 550 can present lighting data including coordinated lighting instructions, such as synchronized show numbers, to eligible wagering game machines including wagering game machines 501, 503, and 505-507. For instance, at a first time, the network lighting controller 550 sends lighting data to an emotive lighting controller for wagering game machine 501, which in turn lights up emotive lighting devices on the wagering game machine 501. At a second time, the network lighting controller 550 sends lighting data to the emotive lighting controller for wagering game machine 501 to dim, or turn off, emotive lighting on wagering game machine 501. Also at the second time, the network lighting controller 550 sends lighting data to an emotive lighting controller for wagering game machine 503, which lights up emotive lighting devices on the wagering game machine 503. The network lighting controller 550 continues sending lighting data to emotive lighting controllers that control (e.g., turn on, turn off, light ups, dim, etc.) emotive lighting devices on eligible wagering game machines, one wagering game machine at a time (e.g., dims lighting on wagering game machine 503 and turns on lighting for wagering game machine 505 at a third time, dims lighting on wagering game machine 505 and turns on lighting on wagering game machine 506 at a fourth time, dims lighting on wagering game machine 506 and turns on lighting on wagering game machine 507 at a fifth time, and so on in a repeating patterns around the eligible wagering game machines 501, 503 and 505-507). The lighting control timing can be very precise and, because the presentation devices are connected to a dedicated lighting network 521, all presentation devices receive their lighting data quickly enough to interpret the lighting data and present light effects in a synchronized pattern. The network lighting controller 550 times and controls the lighting data (e.g., generates show numbers according to an internal timing mechanism, determines where to send show numbers, and sends the show numbers in a synchronized pattern). The presentation devices can interpret and play the lighting data immediately after it is received. In other embodiments, however, the network lighting controller 550 can include timing control instructions in the lighting data in the form of timing instructions. In other embodiments, other lighting control sources (e.g., bank lighting controllers) can send lighting data instead of, or in addition to, lighting data sent from the network lighting controller. Emotive light controllers on presentation devices can prioritize and control the lighting data and use the timing control instructions to present light effects. In other embodiments, the timing control can be stored on the presentation devices themselves in the form of timing instructions that interpret and manipulate the timing of the presentation. In other embodiments, other devices or services on the network can provide timing data (e.g., a lighting controller connected via an Ethernet network dedicated strictly to presenting timing control data for light effects).

Returning to FIG. 3, the flow 300 continues at processing block 306, where the system uses the lighting data to determine a sound effect that accompanies the light effect and presents the accompanying sound effect contemporaneously with the light effect. The lighting data can trigger audio effects on the presentation device or on associated audio production devices. For instance, in some embodiments the presentation devices can store sound scripts, or audio playlists, that reference sound files for audio effects. The audio playlists can be associated with show numbers and frame numbers provided in the lighting data. The presentation devices can monitor the show numbers and frame numbers from the lighting data and activate the audio playlists to play the sound files. The presentation devices can have the show numbers and frame numbers stored in configuration files (e.g., light effect playlists and audio playlists). When the presentation device receives the lighting data, as described further above, the presentation device can reference the light effect playlists to determine how to present light shows on emotive lighting devices associated with the presentation device. As the same time, the presentation devices can reference audio playlists to determine how to present sound shows that accompany (e.g., are closely tied to) the light shows. Thus, the presentation devices (e.g., emotive light controllers associated with the presentation devices) monitor light commands, but use the light commands to trigger both light and sound content, for example, as described earlier in FIGS. 1A and 1B. In some embodiments, the sound effect is a specific sound, or series of sounds, that coordinates with (e.g., accompanies, enhances, completes, mirrors, matches, parallels, harmonizes with, comports with, complements, corresponds with, balances, correlates with, conforms to, etc.) presentation characteristics (e.g., intensity, frequency, duration, directionality, etc.) of a light effect to create a coordinated multimedia show that includes coupled sound effects and light effects. In FIGS. 4A and 4B, for example, the lightning strike light effect can have accompanying thunder sound effects. The thunder sound effects can follow the light effects and emanate, or extend, outward from the lightning strike in a pre-determined sound presentation pattern. For example, at time t1, in FIG. 4A, the wagering game machine 410 and the theatrical light panel 412 receive the show number 12. The theatrical light panel 412 refers to the show configuration file 417 that references the show number 12 and indicates that for frames 1-50, the speaker 414 should play a "crack.wav" sound file at a volume level of "+100." At the same time t1, the wagering game machine 410 refers to the show configuration file 419 that references the show number 12 and indicates that for frames 1-50, the speakers 411 should play the "crack.wav" sound file at a volume level of "+75." The wagering game machine 430, also at time t1, receives the show number 13. The wagering game machine 430 refers to the show configuration file 439 that references the show number 13 and indicates that no sound effect should be played during frames 1-25, but that during frames 26-50, the speakers 431 should play the "crackle.wav" sound file at a volume level of "+50." Presentation devices can interpret show numbers and frame numbers to play a combination of lights or sounds (i.e., both light and sounds, only lights, or only sounds). For instance, shows numbers can triggers lights, for the lightning strike effect, that play a lesser and lesser amount of light. At the same times, show numbers can trigger sounds of the thunder that travels with lesser and lesser amounts of sound to simulate the attenuating sound waves of the thunder (i.e., sound volume ranges from loud to soft). Because of the range of volumes of thunder sound effects, and because the sound of the thunder lingers longer than light effects, some show numbers may trigger only sound effects and not light effects. For example, in FIG. 4B, at time t2, the theatrical light panel 412 receives the show number 14, which does not trigger a light effect because the initial lightning strike had already occurred, but does trigger the speaker 414 to reference the show configuration file 417 and determine that for show 14, from frames 1 to 100, the speaker 414 should play the "rumble.wav" sound file, which produces a lower thunder rumbling sound, that reduces volume level from +75 to 0 throughout the frames 1 to 100. At the same time t2, the theatrical lighting panel 413 can reference the show configuration file 421, which indicates that, during frames 1 to 50, the speaker 415 should present a "rumble.wav" sound file at a volume level of "+50." In some embodiments, the system 400 can also use show numbers, and other lighting data, to trigger, or activate other presentation devices, other than displays or speakers. For example, the system 400 can use lighting data to trigger sub-woofers in a chair, which present inaudible sound waves that generate a rumbling sound. In another example, the system 400 can use lighting data to trigger vibration devices that produce vibrations tied to the multi-media effect (e.g., vibration devices in the chair or handles of a wagering game machine to enhance the thunder effects).

In FIG. 5, the cycling, chase light effect produced by the network lighting controller 550 can have accompanying beeping sounds that indicate when one of the eligible wagering game machines (e.g., machines 501, 503, and 505-507) is selected in turn during the cycling, chase light effect of the musical-chair type game. For instance, as the chase light effect cycles in the chase pattern through the eligible wagering game machines, beeping sound effects can moves in synchronicity with the cycling light effect. For instance, when it is time for the wagering game machine 501 to light up, the wagering game machine 501 can receive a show number 61 and frame number 1. An emotive light controller for the wagering game machine 501 can access a configuration file 517 that indicates a specific sound effect (e.g., "beep.wav") for the show number 61 at frame 1. The speakers on the wagering game machine 501 can produce a "beep" sound effect. In some embodiments, the sound effect is related to a wagering game event, function, outcome, process, activity, etc. For example, in FIG. 5, the "beep" sound effect indicates a current state (e.g., position, location, interval, etc.) in a reveal process for the community musical chair game. When the light effects and "beep" sound effects come to a stop on a wagering game machine, such as wagering game machine 501, casino patrons can visibly see and hear who the winner was for the musical chair game.

Returning to FIG. 3, in some embodiments, presentation devices can include light and sound controllers to interpret show numbers, such as the emotive light controllers 106, 136 and the sound controllers 108 and 138 in FIG. 1B. In some embodiments, a wagering game machine's operating system can be configured to interpret lighting data. In other embodiments, central game controllers, community game controllers, wagering game servers, or other types of centralized servers or devices can interpret lighting data that triggers sound effects. In some embodiments, the system can analyze lighting characteristics and generate sounds that accompany the lighting characteristics (e.g., the system determines a pulsing light effect and generates a sound effect that matches the rhythm of the pulsing, the system determines a light intensity level and matches sound effects to have an equivalent volume level, the system determines a direction of movement for a light effect and generates a sound effect with a matching direction, etc.). In some embodiments, the devices that provide and control lighting data can also provide prioritized lighting commands (e.g., include priority values in the lighting commands) and can synchronize presentation of the light and sound effects on presentation devices using priority values. In some embodiments, the system can use lighting data to trigger gaming activity on the presentation devices (e.g., trigger game activity on an application running a wagering game machine, launch an application, close an application, interact with an accounting system, interact with a marketing server, request maintenance, perform player tracking, etc.).

Additional Example Operating Environments

This section describes example operating environments, systems and networks, and presents structural aspects of some embodiments.

Wagering Game Machine Architecture

Figure 6:
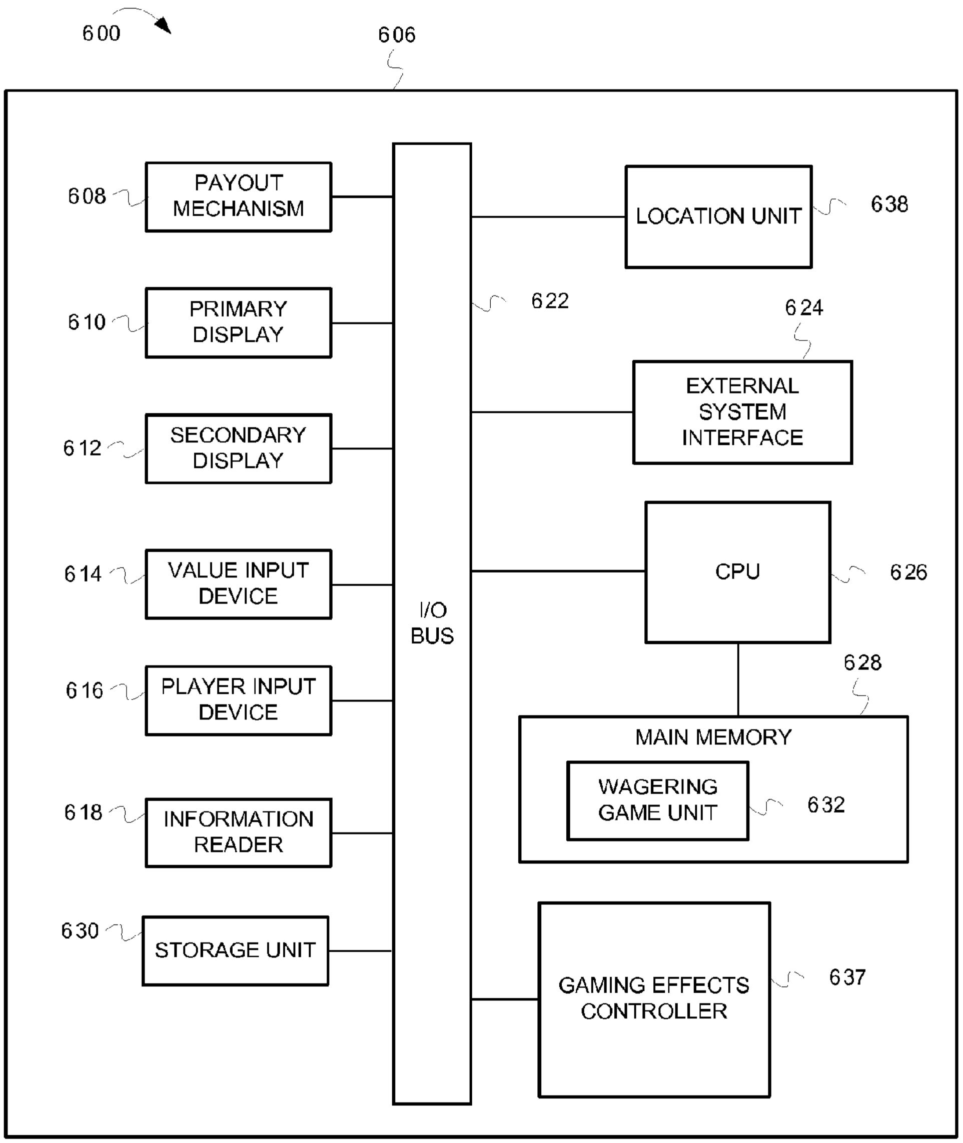
FIG. 6 is an illustration of a wagering game machine architecture 600, according to some embodiments.

FIG. 6 is a conceptual diagram that illustrates an example of a wagering game machine architecture 600, according to some embodiments. In FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In some embodiments, the wagering game unit 632 can present wagering games, such as video poker, video black jack, video slots, video lottery, reel slots, etc., in whole or part.

The CPU 626 is also connected to an input/output ("I/O") bus 622, which can include any suitable bus technologies, such as an AGTL+ frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems (e.g., wagering game networks). The external system interface 624 can include logic for exchanging information over wired and wireless networks (e.g., 802.11g transceiver, Bluetooth transceiver, Ethernet transceiver, etc.)

The I/O bus 622 is also connected to a location unit 638. The location unit 638 can create player information that indicates the wagering game machine's location/movements in a casino. In some embodiments, the location unit 638 includes a global positioning system (GPS) receiver that can determine the wagering game machine's location using GPS satellites. In other embodiments, the location unit 638 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 6, in some embodiments, the location unit 638 is not connected to the I/O bus 622.

In some embodiments, the wagering game machine 606 can include additional peripheral devices and/or more than one of each component shown in FIG. 6. For example, in some embodiments, the wagering game machine 606 can include multiple external system interfaces 624 and/or multiple CPUs 626. In some embodiments, any of the components can be integrated or subdivided.

In some embodiments, the wagering game machine 606 includes a gaming effects controller 637. The gaming effects controller 637 can process communications, commands, or other information, where the processing can control wagering game lighting content and audio content.

Furthermore, any component of the wagering game machine 606 can include hardware, firmware, and/or machine-readable media including instructions for performing the operations described herein.

Wagering Game Machine

Figure 7:
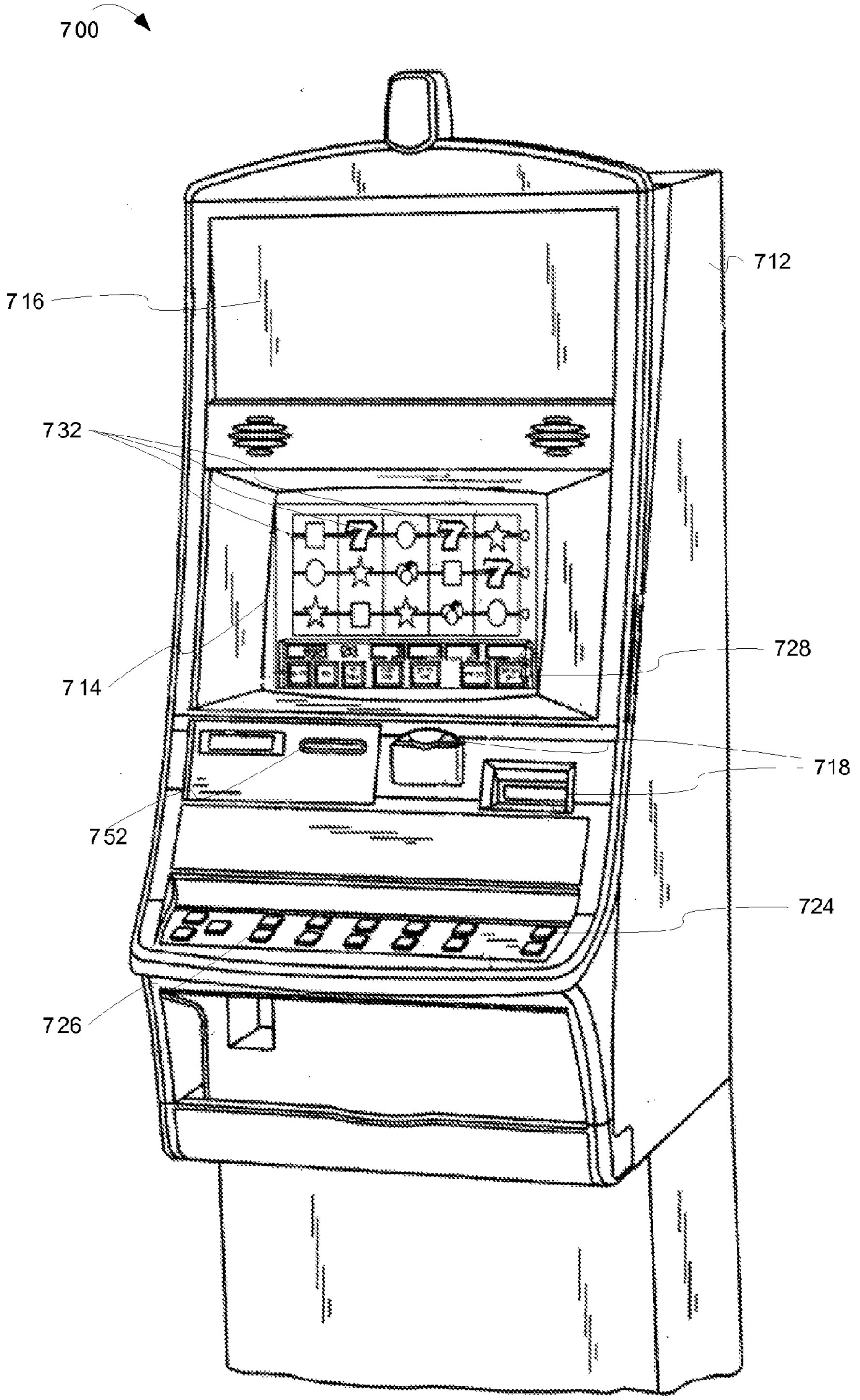
FIG. 7 is an illustration of a wagering game machine 700, according to some embodiments.

FIG. 7 is a conceptual diagram that illustrates an example of a wagering game machine 700, according to some embodiments. Referring to FIG. 7, the wagering game machine 700 can be used in gaming establishments, such as casinos.

According to some embodiments, the wagering game machine 700 can be any type of wagering game machine and can have varying structures and methods of operation. For example, the wagering game machine 700 can be an electro-mechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bar top model, mobile handheld model, or workstation console model.

A player begins playing a basic wagering game by making a wager via the value input device 718. The player can initiate play by using the player input device's buttons or touch screen 728. The basic game can include arranging a plurality of symbols along a pay line 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

receiving lighting data that includes an identifier assigned to a light effect of a synchronized, casino-wide light show, wherein the light effect is presentable via one of a plurality of content presentation devices in a casino, and wherein a timed presentation pattern included in the lighting data indicates presentation timing for the light effect;

presenting the light effect via the one of the plurality of content presentation devices according to the timed presentation pattern associated with the lighting data;

referencing a light effect description, using the identifier, wherein the light effect description specifies one or more characteristics of the light effect;

analyzing, by one or more processors, the one or more characteristics of the light effect;

determining a sound effect based on the analyzing of the characteristics of the light effect; and triggering presentation of the sound effect according to the timed presentation pattern associated with the lighting data.

2. One or more non-transitory, machine-readable storage media having instructions stored thereon, which when executed by a set of one or more processors cause the set of one or more processors to perform operations comprising:

receiving lighting data via a lighting network;

determining a light effect for a light show based on a light effect identifier included in the lighting data, wherein the light effect is configured for presentation, according to a timed presentation pattern via a plurality of content presentation devices in a casino;

analyzing the light effect;

determining a sound effect in response to the analyzing the light effect; and presenting the sound effect, contemporaneously with the light effect, according to the timed presentation pattern.

3. The one or more non-transitory, machine-readable storage media of claim 2, wherein said operation of determining the sound effect includes operations comprising:

selecting an audio file stored on the wagering game machine based on the analyzing the light effect, wherein the audio file has a timing pattern that matches the timed presentation pattern.

4. The one or more non-transitory, machine-readable storage media of claim 2, wherein the lighting data does not include the sound effect.

5. The one or more non-transitory, machine-readable storage media of claim 2, wherein the operations further comprise using the lighting data to trigger game activity on the wagering game machine.

6. The one or more non-transitory, machine-readable storage media of claim 5, wherein the operations for using the lighting data to trigger the game activity on the wagering game machine includes operations for using the lighting data to trigger a game event on a wagering game application running on the wagering game machine.

7. The one or more non-transitory, machine-readable storage media of claim 2, wherein the operations for analyzing the light effect include:

determining presentation characteristics of the light effect; and analyzing the presentation characteristics of the light effect, wherein the operations for triggering the sound effect include operations for generating the sound effect with additional characteristics that correspond to the presentation characteristics, and wherein the operation for presenting the sound effect includes operations for causing the additional characteristics of the sound effect to coordinate with the presentation characteristics of the light effect.

8. The one or more machine-readable storage media of claim 2, wherein the operations further comprise using the lighting data to one or more of launch an application, close an application, interact with an accounting system, interact with a marketing server, request maintenance, and perform player tracking.

9. A system comprising:

one or more processors; and one or more memory storage devices configured to store instructions, which when executed by at least one of the one or more processors, cause the system to perform operations to, receive lighting data via one of a plurality of communication channels of a lighting network, wherein the lighting data is for a casino show related to a wagering game event for a community wagering game, analyze a first characteristic of a light effect specified in the lighting data, wherein the light effect is presentable from at least one casino-content presentation device for the casino show, and determine, based on analysis of the first characteristic, a sound effect that has a second characteristic that corresponds to the first characteristic of the light effect.

10. The system of claim 9, wherein the one or more memory storage devices are configured to store instructions, which when executed by at least one of the one or more processors, cause the system to perform operations to present the light effect, via the at least one casino-content presentation device, contemporaneously with the sound effect.

11. The system of claim 9, wherein the first characteristic is a timed presentation pattern for the light effect, and wherein the one or more memory storage devices are configured to store instructions, which when executed by at least one of the one or more processors, cause the system to perform operations to synchronize a timing pattern for the sound effect with the timed presentation pattern for the light effect.

12. An apparatus comprising:

one or more processors; and a sound controller configured to, via the one or more processors, receive lighting data from a network lighting controller, wherein the lighting data is for a casino-wide content presentation that is presentable on a plurality of presentation devices in a casino, wherein the plurality of presentation devices are different from the network lighting controller, determine a light effect specified in the lighting data, analyze the light effect, based on analysis of the light effect, determine a sound effect that corresponds to the light effect, and wherein the sound effect is not included in the lighting data, and present the sound effect contemporaneously with the light effect as part of the casino-wide content presentation.

13. The apparatus of claim 12, wherein the sound controller is configured to:

analyze one or more presentation characteristics of the light effect; and based on analysis of the one or more presentation characteristics of the light effect, cause one or more presentation characteristics of the sound effect to coordinate with the one or more presentation characteristics of the light effect.

14. The apparatus of claim 13, wherein the one or more presentation characteristics of the light effect comprise one or more of an intensity, a frequency, a duration, and a directionality of the light effect.

15. The apparatus of claim 12, wherein the sound controller is configured to:

select, based on the analysis, a sound file stored on a local memory storage device associated with one or more of the plurality of casino-content presentation devices; and use the sound file to present the sound effect.

16. A computer-implemented method comprising:

receiving lighting data for a light effect of a casino light show, wherein the light effect is presentable via at least one of a plurality of content presentation devices in a casino;

analyzing, via one or more processors, one or more first characteristics of the light effect; and based on the analyzing, determining a sound effect with one or more second characteristics that correspond to the one or more first characteristics of the light effect.

17. The computer-implemented method of claim 16, wherein the lighting data includes a timed presentation pattern that indicates presentation timing for the light effect, wherein the analyzing the one or more first characteristics comprises analyzing the timed presentation pattern, and wherein the determining the sound effect comprises determining a sound effect with a timing pattern that is synchronized with the timed presentation pattern.

18. The computer-implemented method of claim 17, wherein an identifier assigned to the light effect is included in the lighting data, and further comprising referencing a light effect description, using the identifier, wherein the description describes the one or more first characteristics.

19. The computer-implemented method of claim 16, wherein sound data for the sound effect is not included in the lighting data.

20. The computer-implemented method of claim 16, wherein the one or more first characteristics indicate a pulsing pattern of the light effect, and wherein the determining the sound effect comprises determining a sound effect having a rhythm that corresponds to the pulsing pattern.

21. The computer-implemented method of claim 16, wherein the one or more first characteristics indicate a light intensity level for at least a portion of the light effect and wherein the determining the sound effect comprises determining a sound effect with a volume level that corresponds to the light intensity level.

22. The computer-implemented method of claim 16, wherein the one or more first characteristics indicate a direction of movement for the light effect, and wherein the determining the sound effect comprises determining a sound effect to correspond to the direction of movement of the light effect.

23. The computer-implemented method of claim 16, wherein the one or more first characteristics indicate a duration of the light effect, and wherein the determining the sound effect comprises controlling a duration of the sound effect to correspond to the duration of the light effect.

24. The computer-implemented method of claim 16, wherein the lighting data includes a timed presentation pattern for the light effect, wherein the analyzing the one or more first characteristics comprises analyzing the timed presentation pattern, and wherein the determining the sound effect comprises queuing the sound effect for presentation after the timed presentation pattern of the light effect terminates.

* * * * *